(12) United States Patent
Bennett et al.

(10) Patent No.: US 7,024,268 B1
(45) Date of Patent: Apr. 4, 2006

(54) FEEDBACK CONTROLLED POLISHING PROCESSES

(75) Inventors: Doyle E. Bennett, Santa Clara, CA (US); Boguslaw A. Swedek, Cupertino, CA (US); Arulkumar Shanmugasundram, Sunnyvale, CA (US)

(73) Assignee: Applied Materials Inc., Santa Clara, CA (US)

( * ) Notice: Subject to any disclaimer, the term of this patent is extended or adjusted under 35 U.S.C. 154(b) by 0 days.

(21) Appl. No.: 10/396,299

(22) Filed: Mar. 24, 2003

Related U.S. Application Data (60) Provisional application No. 60/366,271, filed on Mar. 22, 2002.

(51) Int. Cl.
  *G06F 19/00* (2006.01)
(52) U.S. Cl. .................. 700/121; 700/164; 700/175; 700/195; 438/692; 451/5; 451/6
(58) Field of Classification Search .................. 451/5, 451/6, 8; 700/110, 121, 96, 108, 117, 159, 700/160, 164, 174, 175, 195, 275; 438/692; 703/2
See application file for complete search history.

(56) References Cited

U.S. PATENT DOCUMENTS

| 5,081,796 A | 1/1992 | Schultz |
| 5,486,129 A | 1/1996 | Sandhu et al. |
| 5,658,183 A | 8/1997 | Sandhu et al. |
| 5,730,642 A | 3/1998 | Sandhu et al. |
| 5,738,574 A | 4/1998 | Tolles et al. |
| 5,840,614 A | 11/1998 | Sim et al. |
| 5,985,094 A | 11/1999 | Mosca |
| 6,159,073 A * | 12/2000 | Wiswesser et al. ............ 451/6 |
| 6,280,289 B1 | 8/2001 | Wiswesser et al. |
| 6,399,501 B1 | 6/2002 | Birang et al. |
| 6,422,927 B1 | 7/2002 | Zuniga |
| 6,494,765 B1 * | 12/2002 | Gitis et al. .................... 451/5 |
| 6,572,441 B1 * | 6/2003 | Lukner et al. ................. 451/5 |
| 6,602,724 B1 | 8/2003 | Redeker et al. |
| 6,609,947 B1 * | 8/2003 | Moore .......................... 451/5 |
| 6,669,539 B1 * | 12/2003 | Amartur ....................... 451/57 |
| 6,766,215 B1 * | 7/2004 | Lensing et al. ............ 700/121 |

(Continued)

FOREIGN PATENT DOCUMENTS

DE  3801969 A  7/1989

(Continued)

OTHER PUBLICATIONS

U.S. Appl. No. 10/920,701, filed Aug. 17, 2004, Bennett et al., 28 pages.

(Continued)

*Primary Examiner*—Hadi Shakeri
(74) *Attorney, Agent, or Firm*—Patterson & Sheridan (57) ABSTRACT

Methods and apparatus for feedback controlled polishing. A computer program product for generating feedback for chemical mechanical polishing. The product includes instructions operable to cause a processor to receive monitoring information during a current polishing cycle in which a first polishing process is performed on a substrate that includes a metal layer. The first polishing process clears the metal layer from the substrate during the current polishing cycle. The product includes instructions to calculate a representation of a clearing profile of the first polishing process. The calculation is based on the monitoring information received during the current polishing cycle. The product includes instructions to detect non-uniformity in the representation. The product includes instructions to generate, from the non-uniformity detected, feedback information for improving the uniformity of a clearing profile of the first polishing process for a subsequent polishing cycle.

9 Claims, 7 Drawing Sheets

U.S. PATENT DOCUMENTS

| | | |
|---|---|---|
| 6,776,692 B1 | 8/2004 | Zuniga et al. |
| 2002/0098777 A1* | 7/2002 | Laursen et al. ............... 451/6 |
| 2003/0199112 A1 | 10/2003 | Shanmugasundram et al. |

FOREIGN PATENT DOCUMENTS

| | | |
|---|---|---|
| EP | 0904895 A | 3/1999 |

OTHER PUBLICATIONS

U.S. Appl. No. 10/920,726, filed Aug. 17, 2004, David et al., 34 pages.

\* cited by examiner

FEEDBACK CONTROLLED POLISHING PROCESSES

This application claims priority to Provisional U.S. Application Ser. No. 60/366,271, filed on Mar. 22, 2002, which application is hereby incorporated by reference in its entirety.

BACKGROUND

The present invention relates to chemical mechanical polishing of substrates.

An integrated circuit is typically formed on a substrate by the sequential deposition of conductive, semiconductive, or insulative layers on a silicon wafer. One fabrication step involves depositing a filler layer over a non-planar surface, and planarizing the filler layer until the top surfaces of raised structures of the underlying layer are exposed. For example, a conductive filler layer can be deposited on a patterned insulative layer to fill the trenches or holes in the insulative layer. In this case, the portion of the layer that is raised above the bottom of the trenches or holes form the raised pattern. The filler layer is then polished until the raised pattern of the insulative layer is exposed. The process of planarizing the filler layer until the top surfaces of raised structures of the underlying layer are exposed is also referred to as clearing the filler layer. The time required to clear the filler layer will be referred to in this specification as time clearing time. After planarization, the portions of the conductive layer remaining between the raised pattern of the insulative layer form vias, plugs, and lines that provide conductive paths between thin film circuits on the substrate. Copper damascene is one example of the above described fabrication step.

Chemical mechanical polishing ("CMP") is one polishing technique that can be used for planarization. CMP typically requires that the substrate be mounted on a carrier or polishing head. The exposed surface of the substrate is placed against a rotating polishing disk pad or belt pad. The polishing pad can be either a "standard" pad or a fixed-abrasive pad. A standard pad has a durable roughened surface, whereas a fixed-abrasive pad has abrasive particles held in a containment media. The carrier head provides a controllable load on the substrate to push it against the polishing pad. A polishing slurry, including at least one chemically-reactive agent, and abrasive particles if a standard pad is used, is supplied to the surface of the polishing pad.

Planarization can generally include different polishing processes. For example, planarization can include a first polishing process, for removing the bulk of a filler layer, and a second polishing process, for removing the small amount of the filler layer remaining. The term polishing process refers to a combination of particular actions performed, in a particular sequence, using particular devices and particular materials to remove material. A polishing process can apply one or more polishing techniques.

A polishing process has parameters, exhibits characteristics, and yields results. Parameters of a polishing technique can include, for example, slurry flow rate, force on a abrasive surface being used to polish the substrate, and the radial speed at which the abrasive surface is being rotated. The characteristics of a polishing process can be the manner in which the process removes material, also referred to as the removal profile of the polishing process. A removal profile of a polishing process, which, as described, is a manner in which the polishing process removes material, is different from a thickness profile of a layer, which is the shape of a cross section of the layer. A removal profile is also different from a clearing profile of a substrate, which is the resulting shape of a cross section of a substrate after a filler layer has been cleared. Performing a polishing process on a substrate, that has an initial or pre-polish thickness profile, usually changes the pre-polish thickness profile to a resulting or post-polish thickness profile.

When they are used to manufacture integrated circuits, polishing processes are usually performed in cycles. For example, given a particular polishing process, the actions of this particular process are repeated for each substrate in an assembly line of substrates. A cycle can include one or more polishing processes. For example, given the first and second polishing processes described above, the actions of these processes are repeated for each substrate in the assembly line of substrates.

A clearing profile of a substrate is typically not uniform. When planarization includes a first and a second polishing process, such as, for example, the above described polishing processes, there are three possible causes of the non-uniformity. These are variations in the pre-polish thickness profile of the substrate and variations in the removal profiles of the first and second polishing processes being used to clear a filler layer from the substrate.

A polishing process such as, for example, one that applies CMP, is complete when a substrate layer has been planarized to a desired flatness or thickness, when a filler layer has been cleared, or when a desired amount of material has been removed. The completion or end of the polishing process is sometimes referred to as the polishing end point. In-situ monitoring of the substrate can been performed, for example, with optical or capacitance sensors, in order to detect a polishing endpoint. Other proposed endpoint detection techniques have involved measurements of friction, motor current, slurry chemistry, acoustics and conductivity. One detection technique that has been considered is to induce an eddy current in the metal layer and measure the change in the eddy current as the metal layer is removed.

SUMMARY

The invention provides methods and apparatus, including computer program products, for performing feedback-controlled polishing processes.

In general, in one aspect, the invention provides a computer program product for generating feedback for chemical mechanical polishing. The product includes instructions operable to cause a processor to receive monitoring information during a current polishing cycle in which a first polishing process is performed on a substrate that includes a metal layer. The first polishing process clears the metal layer from the substrate during the current polishing cycle. The product includes instructions to calculate a representation of a clearing profile of the first polishing process. The calculation is based on the monitoring information received during the current polishing cycle. The product includes instructions to detect non-uniformity in the representation. The product includes instructions to generate, from the non-uniformity detected, feedback information for improving the uniformity of a clearing profile of the first polishing process for a subsequent polishing cycle. The product is tangibly stored on machine-readable medium.

In general, in another aspect, the inventions provides a method for generating feedback for chemical mechanical polishing. The method includes receiving monitoring information during a first polishing cycle in which a first polishing process is performed on a substrate that includes a metal layer. The monitoring information includes information for two or more sampling regions that correspond to different annular regions of the substrate. The first polishing process clears the first metal layer from the substrate during the first polishing cycle. The method includes calculating, for each sampling region, a clearing time of the first polishing process, the calculation being based on the monitoring information received. The method includes determining a target profile for a subsequent polishing cycle, the calculating being based on the clearing times calculated.

Possible advantages of implementations of the invention can include one or more of the following. Monitoring information, obtained during one polishing cycle and from one polishing station where a first polishing process is performed, can be used to adjust either the first polishing process in a subsequent polishing cycle or a second polishing process in the subsequent cycle. The first and second polishing processes are both performed for each polishing cycle. The second polishing process is one that is performed before the first polishing process is performed. The clearing times for different regions of a substrate can be derived from the monitoring information and, furthermore, can be used to adjust the polishing processes. The use of clearing times advantageously accounts for non-uniform removal profiles of the polishing processes, without requiring calculations or measurement of removal rates. Feedback as described in this specification can adjust for the slow drift in the polishing processes that might result from the aging of consumables such as, for example, polishing pad, conditioning disk, slurry, retaining rings on a head. The feedback can be controlled by software so that adjustment of a polishing process is head-specific, which can thus account for slight process differences between different polishing heads. Non-uniformity of a clearing profile is convergently reduced after several cycles.

Other features and advantages of the invention will become apparent from the following description, including the drawings and claims.

DETAILED DESCRIPTION

A polishing cycle includes a first polishing process and a second polishing process that is performed after the first process is performed. The first polishing process is performed at a first polishing station. The second polishing process is performed at a second polishing station. In this implementation of a polishing cycle, monitoring information obtained from the second polishing station during a current polishing cycle is used as feedback to adjust either the first or second polishing process of a subsequent polishing cycle. After several cycles, the adjusted process can clear a filler layer simultaneously everywhere on a substrate.

Monitoring can be done using optical monitors, eddy current monitors, or a combined optical/eddy current monitor. One example of an optical monitor is the Full Scan ISRM, available from Applied Materials, of Santa Clara, Calif. The Full Scan ISRM detects changes in the intensity of light reflected off the substrate work surface. The intensity is nearly constant until the filler layer begins to clear. The Full Scan ISRM typically includes a detector that is translated relative to a substrate being monitored. Usually, the detector is translated so that different areas of the substrate can be monitored. The Full Scan ISRM provides a scan, which can be a graph showing reflected intensity as a function of time or position of the detector. The x-axis of the graph can be divide into scan regions, each of which can correspond to particular areas of a substrate being monitored. A particular polishing process can have a particular removal profile. In some cases, the removal profile is not uniform. The described scan regions can be defined so that the removal rates within each scan region are relatively constant.

The Full Scan ISRM can also provide one or more traces. A trace can be a graph showing reflected intensity, as detected by the detector at a particular position, as a function of time. A trace can, thus, show change in reflected intensity at a particular area of a substrate being monitored.

One example of a combined optical/eddy current monitor is the iScan ISRM, also available from Applied Materials. The iScan can provide information similar to those described with respect to the Full Scan ISRM. Monitoring information, for example, the scan and traces described, can be sent to a computer for processing and storage. The computer can use the monitoring information as feedback to change the first or second polishing processes in subsequent polishing cycles. Devices like the described monitoring systems are further described in commonly assigned U.S. Pat. No. 6,602,724, which is hereby incorporated by reference in its entirety.

Particular polishing processes can result in different post-polish thickness profiles. The post-polish thickness profile of a substrate subject to the second polishing process or, in cases where the second polishing process clears a filler layer, the clearing profile of the substrate, for example, can be determined by both the pre-polish thickness profile of the substrate and the removal profile of the second polishing process.

As discussed, the interval of time needed to clear a filler layer is the clearing time. The clearing time for each scan region can be derived from the monitoring information and used to adjust the polishing processes in the subsequent polishing cycles. Specifically, the clearing times can be used to construct either a target pre-polish thickness profile of a substrate incoming to the second station or a post-polish thickness profile of the substrate after being subject to the second polishing process at the second station. Non-uniformity in the clearing profile, i.e., the difference between or among clearing times, can be detected. This information can be used to adjust a polishing cycle. For example, if the clearing time for a particular scan region is less than clearing times of other scan regions, then this information can be used to increase the clearing time of the particular scan region in the next polishing cycle. Adjustment can include making the removal rate slower by, for example, twenty percent. Adjustment can also include making the pre-polish thickness of the incoming substrate greater by, for example, twenty percent at the area that corresponds to the particular region.

Figure 1:
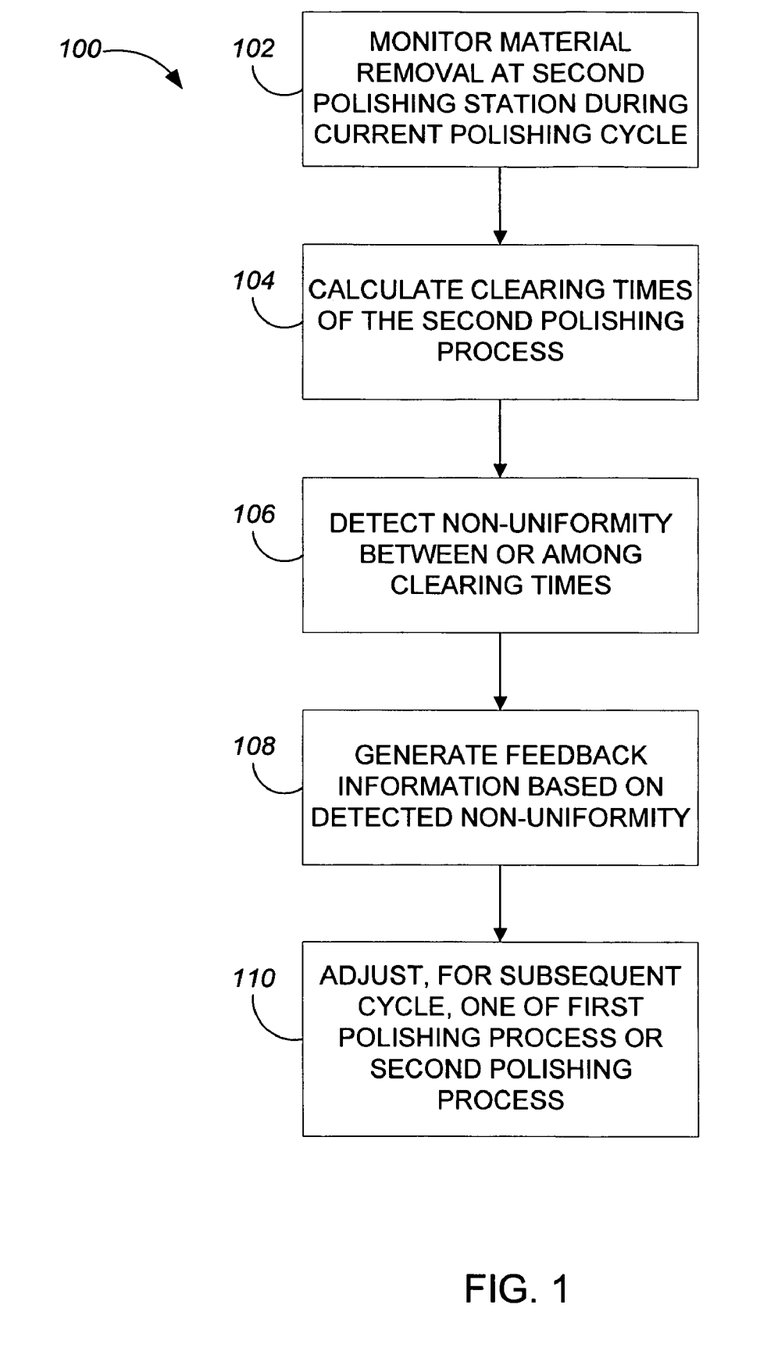
FIG. 1 is a flowchart illustrating a method for feedback controlled polishing.

As shown in FIG. 1, a system performing method 100 monitors material removal at a second polishing station during a current polishing cycle (step 102). During each polishing cycle, a first and second polishing process are sequentially performed on a current substrate. The first polishing process is performed at a first polishing station and the second polishing process is performed at the second polishing station. The first polishing process can be, for example, a bulk removal process and the second polishing process can be, for example, a slow clearing process. Monitoring can be done by, for example, a Full Scan ISRM.

The system uses the monitoring information obtained during the second polishing process of the current polishing cycle to calculate clearing times of the second polishing process (step 104). The system can use the monitoring information, for example, traces obtained with the Full Scan ISRM, which can show intensity of reflected light over time for each scan region, to calculate the clearing time for each scan region.

The system detects non-uniformity between or among the clearing times (step 106). Detection can be done by comparing the deviation of each clearing time from an average clearing time. Various other statistical techniques can be applied to detect non-uniformity.

The system generates feedback information (step 108). The system can use the detected non-uniformity to generate feedback information. The system can, for example, calculate, for each scan region, a ratio of the average clearing time and the clearing time of the region. The ratio calculated is either less than 1, equal to 1, or greater than 1. Alternatively, the system can generate a target thickness profile, for use in the next polishing cycle, that is either a post-polish thickness profile that the first polishing process produces or a target clearing profile that the second polishing process produces. The system can calculate the target profile by calculating the target thickness for each region. Calculation, in this case, can include taking the above described ratio and multiplying it to the average of the thickness profile as it exists before the current substrate was subject to the second polishing process. The post-polish thickness profile can be used to adjust parameters of the first polishing process. The clearing profile can be used to adjust parameters of the second polishing process.

The system uses the feedback information to adjust, for a subsequent cycle, one of the first polishing process and the second polishing process (step 110). When the feedback information is the described ratio, adjustments depends on whether the ratio is less than 1, equal to 1, or greater than 1. If, for example, the ratio is greater than 1, then adjustment can be made to decrease the removal rate at this region during the next cycle. Alternatively, the target thickness profile or both the ratios and the target thickness profile can be similarly used as feed back information. In the case when the target thickness profile is used, adjustment depends on whether the target thickness for a region is less than, the same as, or greater than the calculated average thickness. As cycles occur, the clearing times converges and the typical non-uniformity is minimized.

If the removal profile for the second polishing process is available, then a ratio of the average removal rate and the removal rate for each region can be calculated and applied to calculate the target thickness for each region. The application of such a ration can increase the convergence rate. That is, the application of this ration of the average removal rate and the removal rate for each region can reduce the number of cycles needed to have the clearing times converge.

How removal rate or a removal profile is changed can be determined by a computer program product that models the polishing process being adjusted. The model can be based, for example, on empirical information. A product and model that can be used for feedback as described in this specification are further described in commonly assigned U.S. patent application Ser. No. 10/393,531, filed on Mar. 21, 2003, the entire specification is hereby incorporated by reference.

Figure 2:
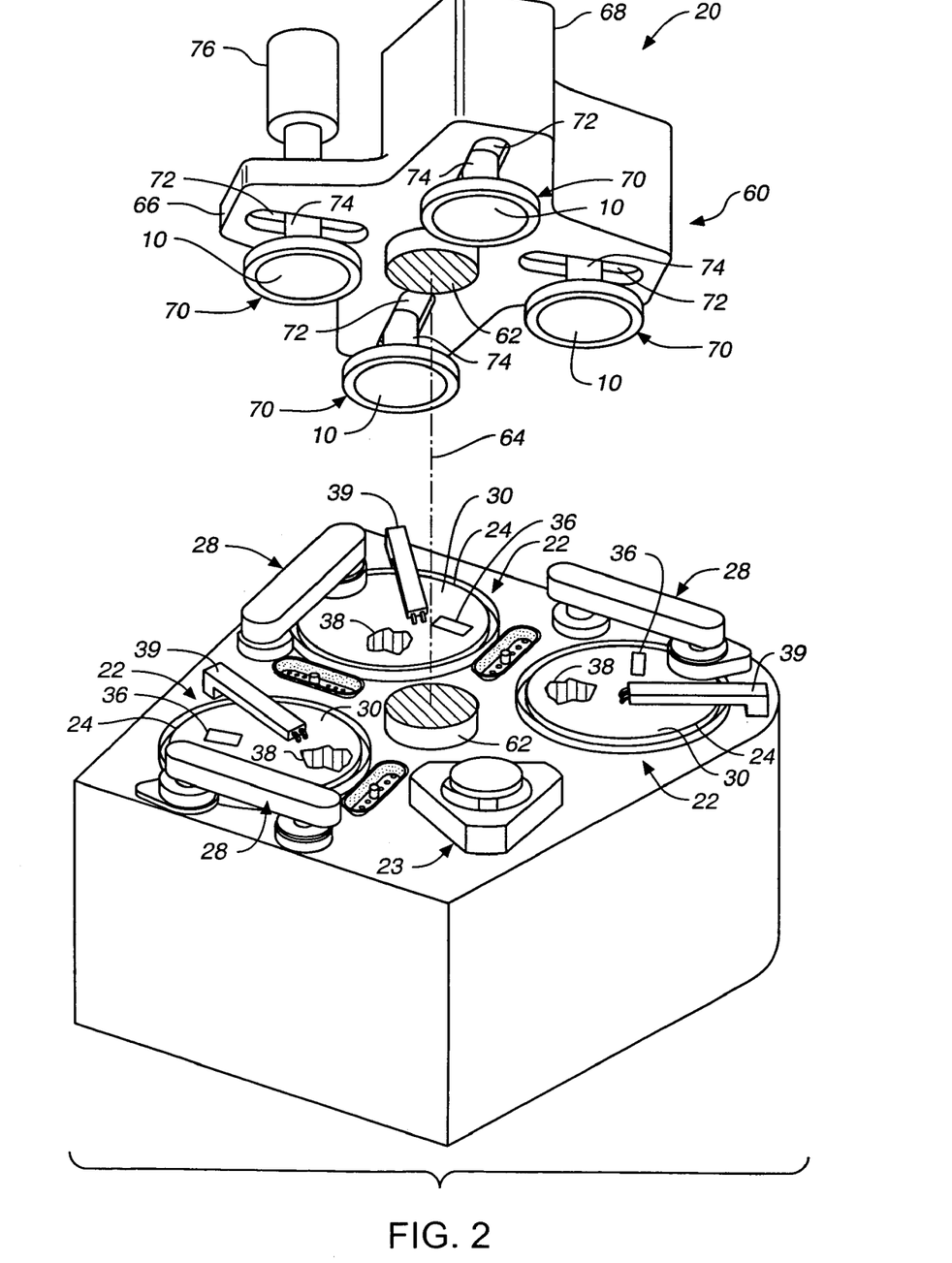
FIG. 2 is a schematic exploded perspective view of a chemical mechanical polishing apparatus.

FIG. 2 shows a CMP apparatus 20, in which one or more substrates 10 can be polished. A description of a similar polishing apparatus 20 can be found in U.S. Pat. No. 5,738,574, the entire disclosure of which is incorporated herein by reference. Polishing apparatus 20 includes a series of polishing stations 22a, 22b and 22c, and a transfer station 23. Transfer station 23 transfers the substrates between the carrier heads and a loading apparatus.

Each polishing station includes a rotatable platen 24 on which is placed a polishing pad 30. The first and second stations 22a and 22b can include a two-layer polishing pad with a hard durable outer surface or a fixed-abrasive pad with embedded abrasive particles. The final polishing station 22c can include a relatively soft pad or a two-layer pad. Each polishing station can also include a pad conditioner apparatus 28 to maintain the condition of the polishing pad so that it will effectively polish substrates.

Figure 3A:
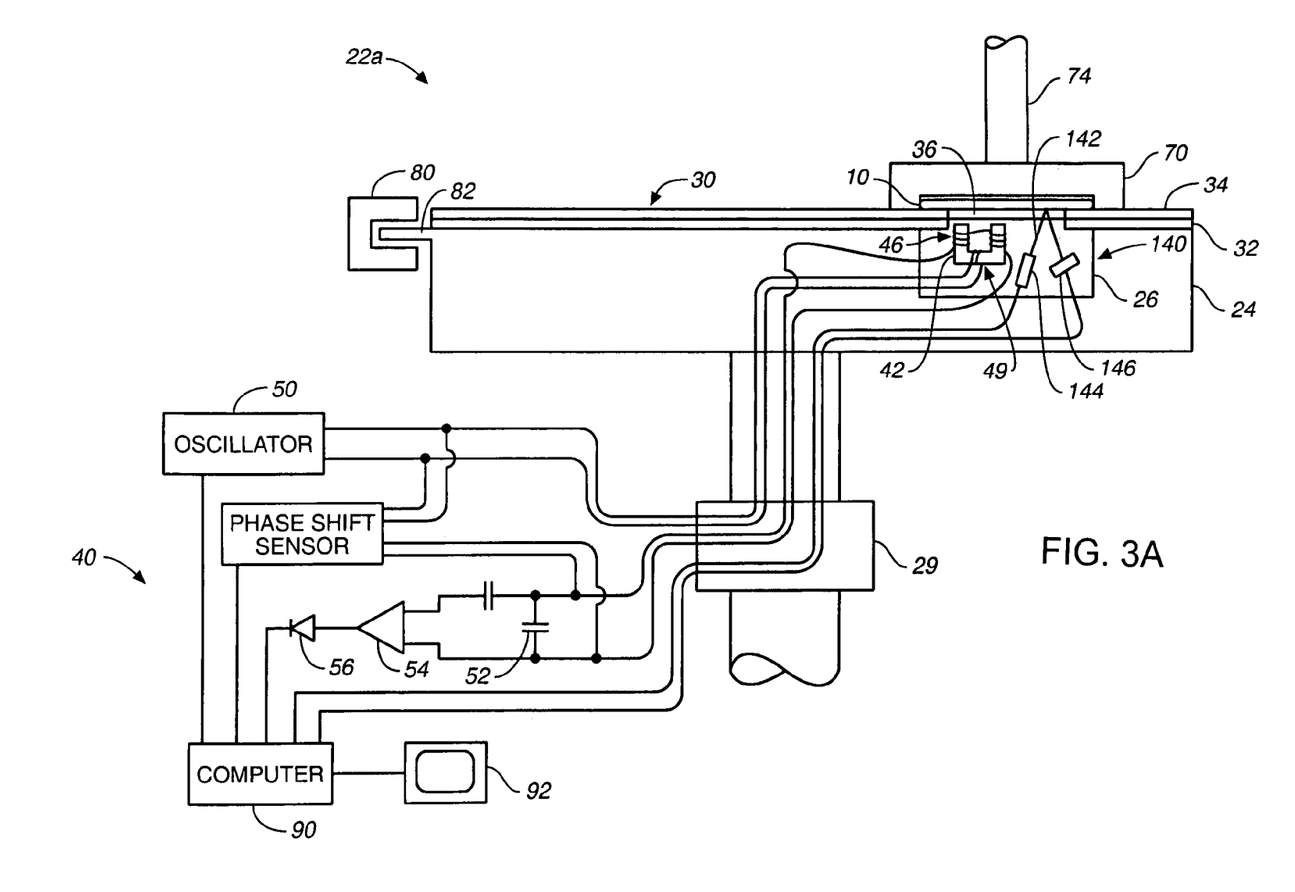
FIG. 3A is a schematic side view, partially cross-sectional, of a chemical mechanical polishing station that includes an eddy current monitoring system and an optical monitoring system.

As shown in FIG. 3A, a two-layer polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 can be composed of foamed or cast polyurethane, possibly with fillers, e.g., hollow microspheres, and/or a grooved surface. Backing layer 32 can be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-4 are product names of Rodel, Inc.).

During a polishing step, a slurry 38 (FIG. 2) containing a liquid (e.g., deionized water for oxide polishing) and a pH adjuster (e.g., potassium hydroxide for oxide polishing) can be supplied to the surface of polishing pad 30 by a slurry supply port or combined slurry/rinse arm 39 (FIG. 2). If polishing pad 30 is a standard pad, slurry 38 can also include abrasive particles (e.g., silicon dioxide for oxide polishing).

A rotatable multi-head carousel 60 supports four carrier heads 70. (See FIG. 2.) The carousel is rotated by a central post 62 about a carousel axis 64 by a carousel motor assembly (not shown) to orbit the carrier head systems and the substrates attached thereto between polishing stations 22 and transfer station 23. Three of the carrier head systems receive and hold substrates, and polish them by pressing them against the polishing pads. Meanwhile, one of the carrier head systems receives a substrate from and delivers a substrate to transfer station 23.

Each carrier head 70 is connected by a carrier drive shaft 74 to a carrier head rotation motor 76 (shown by the removal of one quarter of cover 68) so that each carrier head can independently rotate about it own axis. In addition, each carrier head 70 independently laterally oscillates in a radial slot 72 formed in carousel support plate 66. A description of a suitable carrier head 70 can be found in U.S. Pat. Nos. 6,422,927 and 6,450,868, the entire disclosures of which are incorporated by reference. In operation, the platen is rotated about its central axis 25, and the carrier head is rotated about its central axis 71 and translated laterally across the surface of the polishing pad. Devices similar to the carrier head are described in the above mentioned U.S. Pat. No. 6,602,724.

Figure 3B:
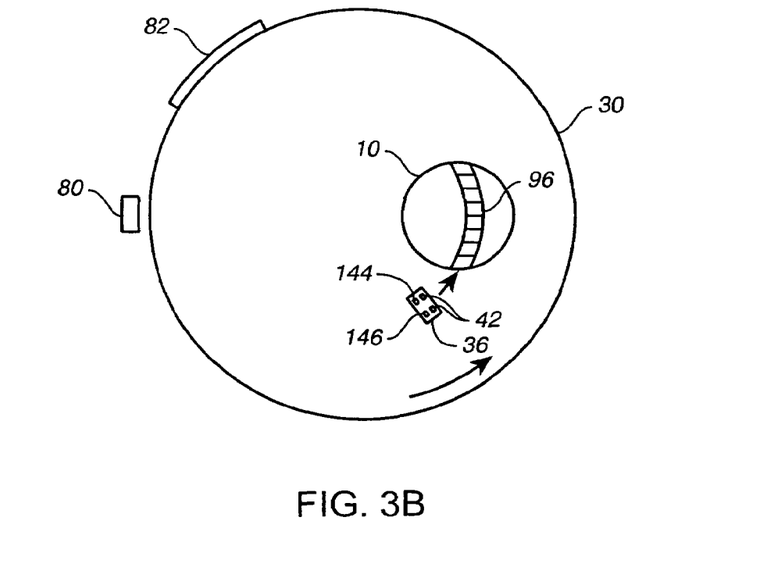
FIG. 3B is a schematic top view of a platen from the polishing station of FIG. 3A.

Referring to FIGS. 3A and 3B, a recess 26 is formed in platen 24, and a transparent section 36 is formed in polishing pad 30 overlying recess 26. Aperture 26 and transparent section 36 are positioned such that they pass beneath substrate 10 during a portion of the platen's rotation, regardless of the translational position of the carrier head. Assuming that polishing pad 32 is a two-layer pad, thin pad section 36 can be constructed by removing a portion of backing layer 32 and inserting a transparent plug 36 into the cover layer 34. The plug 36 can be a relatively pure polymer or polyurethane, e.g., formed without fillers. In general, the material of transparent section 36 should be non-magnetic and non-conductive.

Figure 3C:
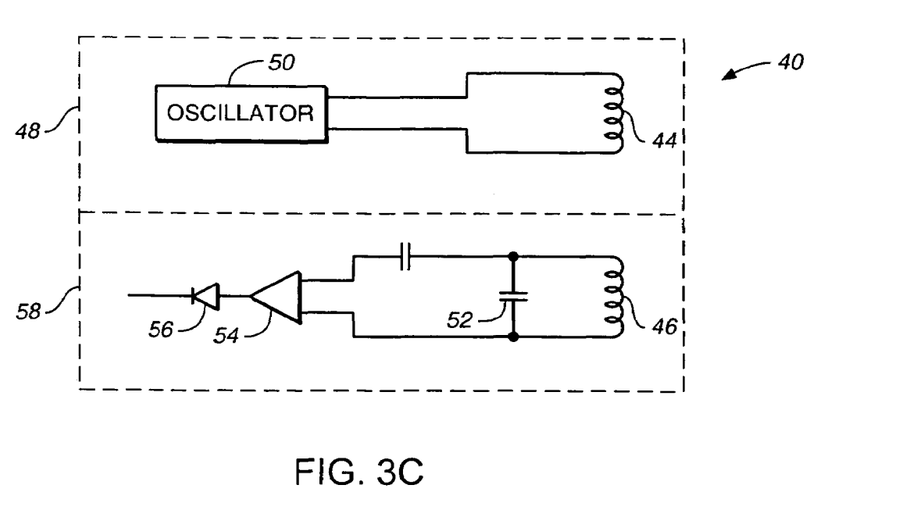
FIG. 3C shows an example eddy current monitoring system.

Referring to FIGS. 2, 3A, and 3C, the first polishing station 22a (FIG. 2) includes an in-situ eddy current monitoring system 40 (FIG. 3C) and an optical monitoring system 140 (FIG. 3A). The eddy current monitoring system 40 and optical monitoring system 140 can function as a polishing process control and endpoint detection system. The second polishing station 22b and the final polishing station 22c can both include just an optical monitoring system, although either may additionally include an eddy current monitoring system.

The optical monitoring system 140, which can function as a reflectometer or interferometer, can be secured to platen 24 in recess 26 adjacent the eddy current monitoring system 40. Thus, the optical monitoring system 140 can measure the reflectivity of substantially the same location on the substrate as is being monitored by the eddy current monitoring system 40. Specifically, the optical monitoring system 140 can be positioned to measure a portion of the substrate at the same radial distance from the axis of rotation of the platen 24 as the eddy current monitoring system 40. Thus, the optical monitoring system 140 can sweep across the substrate in the same path as the eddy current monitoring system 40.

The optical monitoring system 140 includes a light source 144 and a detector 146. The light source generates a light beam 142 which propagates through transparent window section 36 and slurry to impinge upon the exposed surface of the substrate 10. For example, the light source 144 may be a laser and the light beam 142 may be a collimated laser beam. The light laser beam 142 can be projected from the laser 144 at an angle a from an axis normal to the surface of the substrate 10. In addition, if the hole 26 and the window 36 are elongated, a beam expander (not illustrated) may be positioned in the path of the light beam to expand the light beam along the elongated axis of the window. In general, the optical monitoring system functions as described in U.S. Pat. Nos. 6,159,073 and 6,280,289, the entire disclosures of which are incorporated herein by references.

Figure 4:
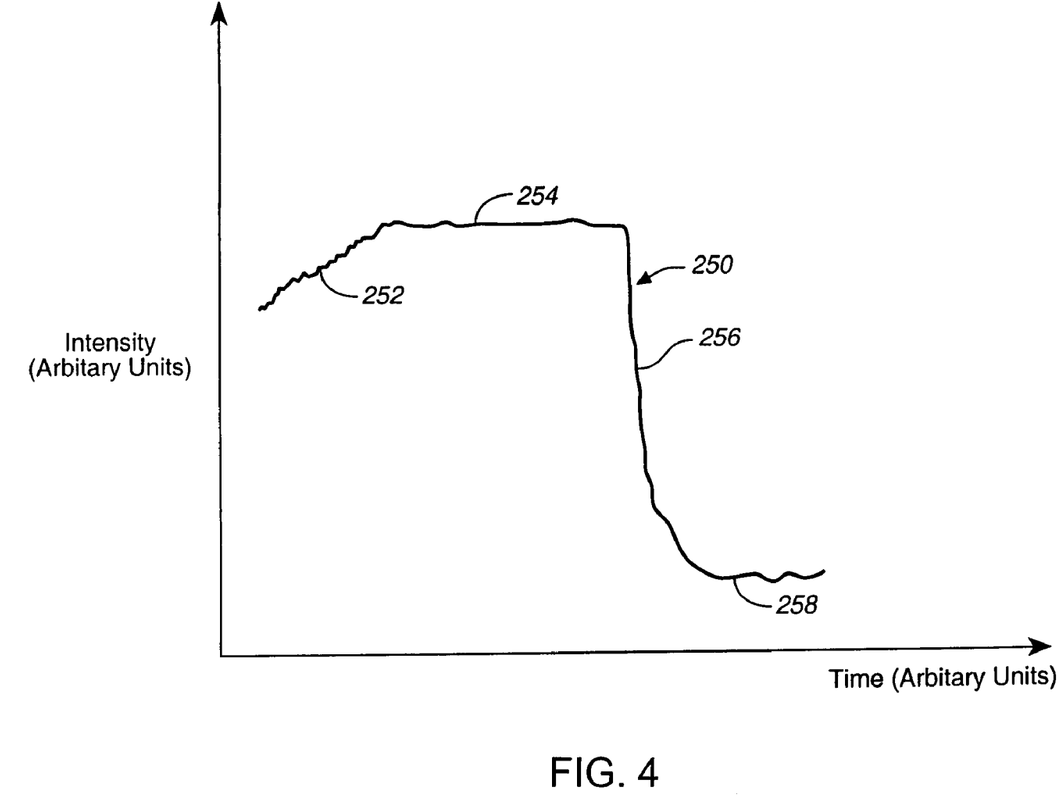
FIG. 4 is a graph illustrating an amplitude trace from the optical monitoring system.

FIG. 4 shows an example of a trace 250 generated by an optical monitoring system. The overall shape of intensity trace 250 may be explained as follows. Initially, the metal layer has some initial topography because of the topology of the underlying patterned layer. Due to this topography, the light beam scatters when it impinges the metal layer. As the polishing operation progresses in section 252 of the trace, the metal layer becomes more planar and the reflectivity of the polished metal layer increases. As the bulk of the metal layer is removed in section 254 of the trace, the intensity remains relatively stable. Once the oxide layer begins to be exposed in the trace, the overall signal strength drops quickly in section 256 of the trace. Once the oxide layer is entire exposed in the trace, the intensity stabilizes again in section 258 of the trace, although it may undergo small oscillations due to interferometric effects as the oxide layer is removed.

Returning to FIGS. 3A and 3B, the CMP apparatus 20 can also include a position sensor 80, such as an optical interrupter, to sense when core 42 and light source 44 are beneath substrate 10. For example, the optical interrupter could be mounted at a fixed point opposite carrier head 70. A flag 82 is attached to the periphery of the platen. The point of attachment and length of flag 82 is selected so that it interrupts the optical signal of sensor 80 while transparent section 36 sweeps beneath substrate 10. Alternately, the CMP apparatus can include an encoder to determine the angular position of platen.

A general purpose programmable digital computer 90 receives the intensity signals and phase shift signals from the eddy current sensing system 40, and the intensity signals from the optical monitoring system 140. Since the monitoring systems sweep beneath the substrate with each rotation of the platen, information on the metal layer thickness and exposure of the underlying layer is accumulated in-situ and on a continuous real-time basis (once per platen rotation). The computer 90 can be programmed to sample measurements from the monitoring system when the substrate generally overlies the transparent section 36 (as determined by the position sensor). As polishing progresses, the reflectivity or thickness of the metal layer changes, and the sampled signals vary with time. As discussed, the time varying sampled signals may be referred to as traces. The measurements from the monitoring systems can be displayed on an output device 92 during polishing to permit the operator of the device to visually monitor the progress of the polishing operation. The computer 90 can use traces to control the polishing process and determine the end-point of the metal layer polishing operation. The computer 90 can also process the traces, e.g., calculate clearing times as described above, and use the information obtained from processing the traces as feedback to change the polishing processes.

In operation, CMP apparatus 20 uses eddy current monitoring system 40 and optical monitoring system 140 to determine when the bulk of the filler layer has been removed and to determine when the underlying stop layer has been substantially exposed. The computer 90 applies process control and endpoint detection logic to the sampled signals to determine when to change process parameter and to detect the polishing endpoint. Possible process control and endpoint criteria for the detector logic include local minima or maxima, changes in slope, threshold values in amplitude or slope, or combinations thereof. The CMP apparatus 20 can also use the monitoring systems, as described above, to provide feedback control to adjust parameters at each station. Pressure, for example, of the described chambers in the carrier head can be adjusted. The rotation speed of a carrier head, for example, can also be adjusted.

In addition, the computer 90 can be programmed to divide the measurements from both the eddy current monitoring system 40 and the optical monitoring system 140 from each sweep beneath the substrate into a plurality of sampling zones 96, to calculate the radial position of each sampling zone, to sort the amplitude measurements into radial ranges, to determine minimum, maximum and average measurements for each sampling zone, and to use multiple radial ranges to determine the polishing endpoint, as discussed in U.S. Pat. No. 6,399,501, the entirety of which is incorporated herein by reference.

Computer 90 may also be connected to the pressure mechanisms that control the pressure applied by carrier head 70, to carrier head rotation motor 76 to control the carrier head rotation rate, to the platen rotation motor (not shown) to control the platen rotation rate, or to slurry distribution system 39 to control the slurry composition supplied to the polishing pad. Specifically, after sorting the measurements into radial ranges, information on the metal film thickness can be fed in real-time into a closed-loop controller to periodically or continuously modify the polishing pressure profile applied by a carrier head, as discussed in U.S. Pat. No. 6,776,692, the entirety of which is incorporated herein by reference. For example, the computer could determine that the endpoint criteria have been satisfied for the outer radial ranges but not for the inner radial ranges. This would indicate that the underlying layer has been exposed in an annular outer area but not in an inner area of the substrate. In this case, the computer could reduce the diameter of the area in which pressure is applied so that pressure is applied only to the inner area of the substrate, thereby reducing dishing and erosion on the outer area of the substrate.

When the computer 90 is programmed to generate feedback as described in FIG. 1, the programming can be implemented as a computer program product that interacts with programs that controls the CMP apparatus 20. The computer 90 can include a computer program product that takes as input the feedback described above in reference to FIG. 1, determines which of the described parameters of the CMP apparatus 20 to adjust, and outputs control signals for adjusting the CMP apparatus 20. Product similar to those described are described in the above referenced U.S. patent application Ser. No. 10/393,531.

Figure 5:
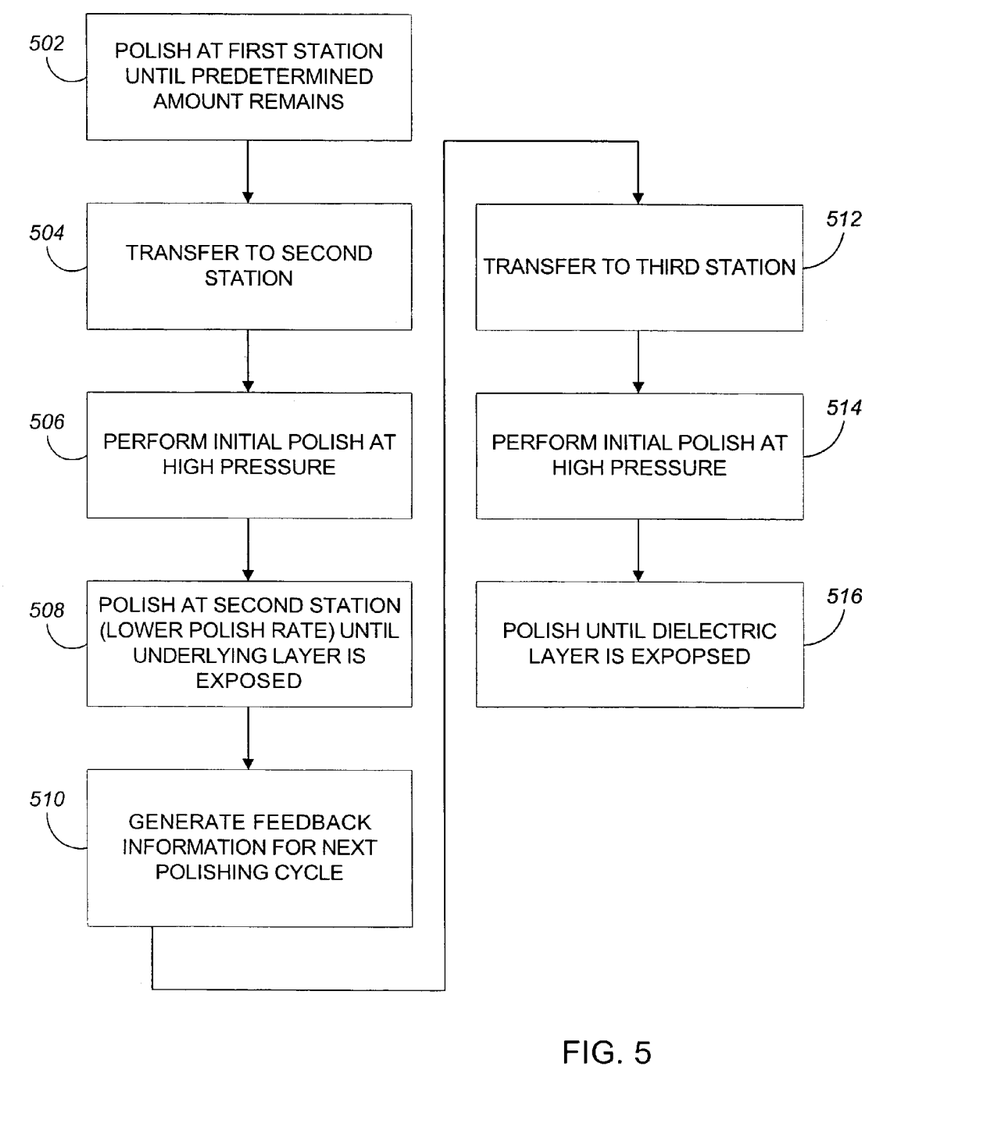
FIG. 5 is a flowchart illustrating a method for feedback-controlled polishing of a metal layer.

A method of polishing a metal layer, such as a copper layer, is shown in flowchart form in FIG. 5. A current substrate is polished at the first polishing station 22a to remove the bulk of the metal layer (step 502). The polishing process is monitored by the eddy current monitoring system 40 (FIG. 3A). When a predetermined thickness, e.g., 2000 Angstroms, of the copper layer remains over an underlying barrier layer, the polishing process is halted and the current substrate is transferred to the second polishing station 22b (step 504). This first polishing endpoint can be triggered when the phase shift signal exceeds an experimentally determined threshold value. Example polishing parameters for the first polishing station include a platen rotation rate of 93 rpm, a carrier head pressure of about 3 psi, and an IC-1010 polishing pad. As polishing progresses at the first polishing station, the radial thickness information from the eddy current monitoring system 40 can be fed into a closed-loop feedback system to control the pressure and/or the loading area of the carrier head 200 on the substrate. The pressure of the retaining ring on the polishing pad may also be adjusted to adjust the polishing rate. This permits the carrier head to compensate for the non-uniformity in the polishing rate or for non-uniformity in the thickness of the metal layer of the incoming substrate. As a result, after polishing at the first polishing station, most of the metal layer has been removed and the surface of the metal layer remaining on the substrate is substantially planarized.

At the second polishing station 22b, the current substrate is polished at a lower polishing rate than at the first polishing station. For example, the polishing rate is reduced by about a factor of 2 to 4, i.e., by about 50% to 75%. To reduce the polishing rate, the carrier head pressure can be reduced, the carrier head rotation rate can be reduced, the composition of the slurry can be changed to introduce a slower polishing slurry, and/or the platen rotation rate could be reduced. For example, the pressure on the substrate from the carrier head may be reduced by about 33% to 50%, and the platen rotation rate and carrier head rotation rate may both be reduced by about 50%. Example polishing parameters for the second polishing station 22b include a platen rotation rate of 43 rpm, a carrier head pressure of about 2 psi, and an IC-1010 polishing pad.

Optionally, when the polishing begins at the second polishing station, the current substrate may be briefly polished, e.g., for about 10 seconds, at a somewhat higher pressure, e.g., 3 psi, and rotation rate, e.g., 93 rpm (step 506). This initial polishing, which can be termed an "initiation" step, may be needed to remove native oxides formed on the metal layer or to compensate for ramp-up of the platen rotation rate and carrier head pressure so as to maintain the expected throughput.

The polishing process is monitored at the second polishing station 22b by the optical monitoring system 140 (FIG. 3A). Polishing proceeds at the second polishing station 22b until the metal layer is removed and the underlying barrier layer is exposed (step 508). Of course, small portions of the metal layer can remain on the substrate, but the metal layer is substantially entirely removed. The optical monitoring system is useful for determining this endpoint, since it can detect the change in reflectivity as the barrier layer is exposed. Specifically, the endpoint for the second polishing station can be triggered when the amplitude or slope of the optical monitoring signal falls below an experimentally determined threshold value across all the radial ranges monitored by the computer. This indicates that the barrier metal layer has been removed across substantially all of the substrate. Of course, as polishing progresses at the second polishing station 22b, the reflectivity information from the optical monitoring system 140 can be fed into a closed-loop feedback system to control the pressure and/or the loading area of the carrier head 200 on the substrate to prevent the regions of the barrier layer that are exposed earliest from becoming overpolished.

The reflectivity information obtained from the optical monitoring system 140 can also be used, as described in FIG. 1, to provide feedback, for a next polishing cycle when a next substrate is being polished, to change the polishing process at either the first polishing station 22a or the second polishing station 22b (step 510). The reflectivity information, e.g., the described scan and traces, can be used to calculate clearing times in each of the sampling zones 96 (FIG. 3B). The computer 90 can calculate the clearing times of each sampling zone. The sampling zones can correspond to different annular regions of the current substrate. Calculations include measuring the interval between the time when polishing starts and when and end point is reached as determine by, for example, when the intensity trace for the sampling zone drops (as shown, e.g., in FIG. 4, when the trace drops from intensity level 254 to intensity level 258). Calculations can also include calculating an average clearing time and clearing time ratios as described in reference to FIG. 1.

By reducing the polishing rate before the barrier layer is exposed, dishing and erosion effects can be reduced. In addition, the relative reaction time of the polishing machine is improved, enabling the polishing machine to halt polishing and transfer to the third polishing station with less material removed after the final endpoint criterion is detected. Moreover, more intensity measurements can be collected near the expected polishing end time, thereby potentially improving the accuracy of the polishing endpoint calculation. However, by maintaining a high polishing rate throughout most of the polishing operation at the first polishing station, high throughput is achieved. Preferably, at least 75%, e.g., 80–90%, of the bulk polishing of the metal layer is completed before the carrier head pressure is reduced or other polishing parameters are changed.

Once the metal layer has been removed at the second polishing station 22b, the substrate is transferred to the third polishing station 22c (step 512) for removal of the barrier layer. Example polishing parameters for the second polishing station include a platen rotation rate of 103 rpm, a carrier head pressure of about 3 psi, and an IC-1010 polishing pad. Optionally, the substrate may be briefly polished with an initiation step, e.g., for about 5 seconds, at a somewhat higher pressure, e.g., 3 psi, and platen rotation rate, e.g., 103 rpm (step 514). The polishing process is monitored at the third polishing station 22c by an optical monitoring system, and proceeds until the barrier layer is substantially removed and the underlying dielectric layer is substantially exposed (step 516). The same slurry solution may be used at the first and second polishing stations, whereas another slurry solution may be used at the third polishing station.

Figure 6:
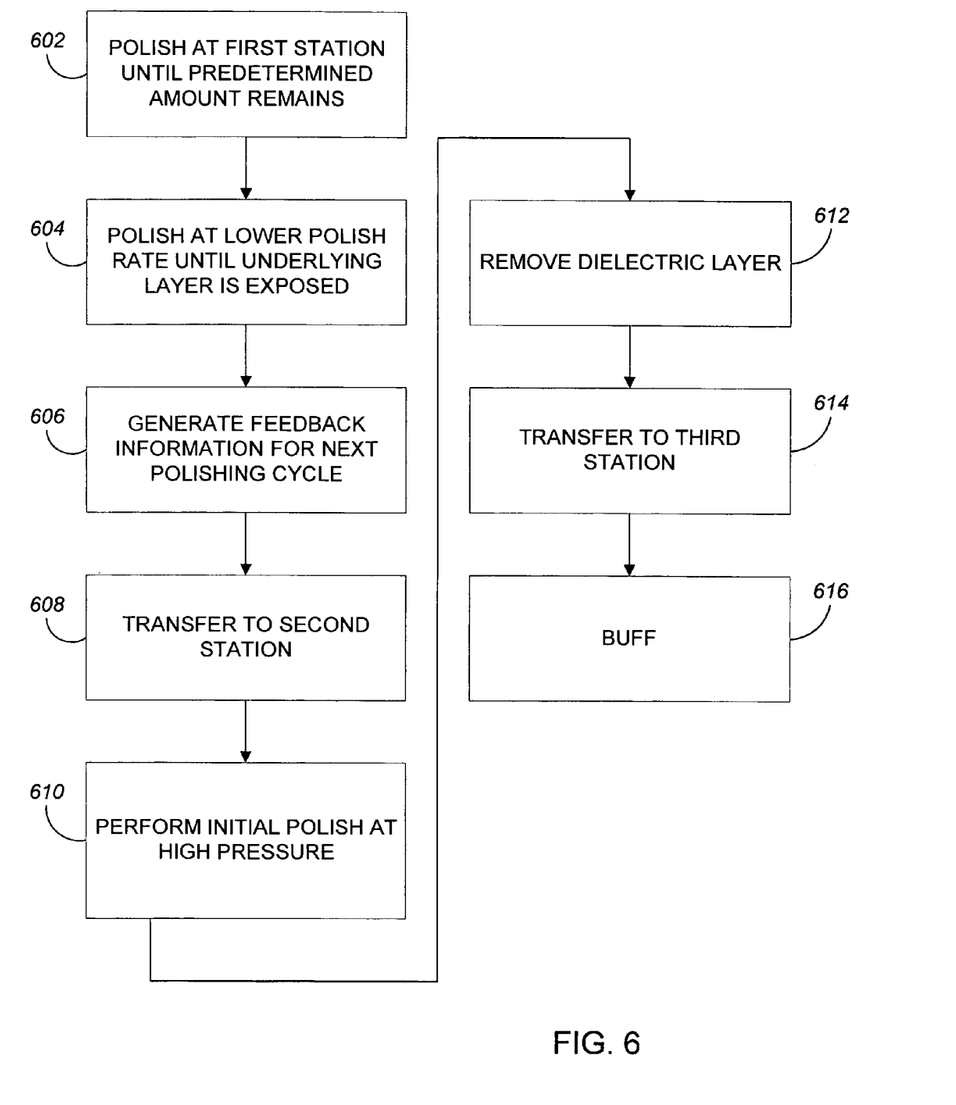
FIG. 6 is a flowchart illustrating an alternative method for feedback-controlled polishing of a metal layer.

An alternative method of polishing a metal layer, such as a copper layer, is shown in flowchart form in FIG. 6. This method is similar to the method shown in FIG. 5. However, both the fast polishing step and the slow polishing step are performed at the first polishing station 22a. Removal of the barrier layer is performed at the second polishing station 22b, and a buffing step is performed at the final polishing station 22c.

Various aspects of the invention, including the method steps described, can be implemented as a computer program product, i.e., a computer program tangibly embodied in an information carrier, e.g., in a machine-readable storage device, for execution by, or to control the operation of, data processing apparatus, e.g., a programmable processor, a computer, multiple computers, or a test system. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

The invention has been described in terms of particular implementations. Other implementations are possible. For example, the steps of the invention can be performed in a different order and still achieve desirable results.

The feedback method described can be incorporated in a variety of polishing systems. The described method is useful not only for CMP process but any polishing process. Adjustment to a polishing process is not limited to changing the example parameters described. Rather, adjustment can include any combination of the following: changing a slurry rate, changing membrane pressure, changing platen radial speed, changing a combination of membrane pressure and platen radial speed, and changing the different pressures applied to the back of a substrate.

The eddy current and optical monitoring systems can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there could be a fluid bearing between the platen and polishing pad during polishing. The polishing pad can be a standard (e.g., polyurethane with or without fillers) rough pad, a soft pad, or a fixed-abrasive pad. Rather than tuning when the substrate is absent, the drive frequency of the oscillator can be tuned to a resonant frequency with a polished or unpolished substrate present (with or without the carrier head), or to some other reference.

Although illustrated as positioned in the same hole, the optical monitoring system 140 could be positioned at a different location on the platen than the eddy current monitoring system 40. For example, the optical monitoring system 140 and eddy current monitoring system 40 could be positioned on opposite sides of the platen, so that they alternately scan the substrate surface.

Various aspects of the invention, such as placement of the coil on a side of the polishing surface opposite the substrate or the measurement of a phase difference, still apply if the eddy current sensor uses a single coil. In a single coil system, both the oscillator and the sense capacitor (and other sensor circuitry) are connected to the same coil.

The feedback calculations described can be performed by one or more computer program products. These products can interface with the computer program products that control the polishing processes. The products for feedback and for control can reside on a same or on different computers. Alternatively, the feedback calculations described and the polishing process control can be performed by the same computer program product.

The substrate described can be any type of substrate. For example, the substrate can be a wafer.

The invention has been described in terms of particular embodiments. Other embodiments are within the scope of the following claims. For example, the steps of the invention can be performed in a different order and still achieve desirable results.

What is claimed is:

1. A computer program product, tangibly stored on machine-readable medium, for generating feedback for chemical mechanical polishing, the product comprising instructions operable to cause a processor to:

receive monitoring information during a current polishing cycle in which a first polishing process is performed on a substrate that includes a metal layer and that includes multiple regions, the first polishing process clearing the metal layer from the substrate during the current polishing cycle, calculate clearing times for the first polishing process, each calculated clearing time corresponding to one of the multiple regions, the calculation being based on the monitoring information received during the current polishing cycle;

detect non-uniformity in the calculated clearing times;

generate, from the non-uniformity detected, feedback information for improving the uniformity of a clearing profile of the first polishing process; and adjust the first polishing process in a subsequent polishing cycle, the adjustment being based on the feedback information.

2. The product of claim 1, wherein a second polishing process is performed before the first polishing process during the current and the subsequent polishing cycles, the product further comprising instructions to:

adjust the second polishing process in one of the subsequent polishing cycles, the adjustment being based on the feedback information.

3. The product of claim 2, wherein:

the first polishing process is a slow removal process and the second polishing process is a bulk removal process.

4. The product of claim 3, wherein:

the current and subsequent polishing cycles are cycles of a copper damascene process.

5. The product of claim 2, further comprising instructions to:

adjust the clearing times of the second polishing process, the adjustment being based on the feedback information.

6. The product of claim 1, wherein the multiple regions of the substrate include annular regions, and wherein monitoring include sampling by a system that has two or more sampling regions, each sampling region corresponding to a different annular region of the substrate, the product further comprising instructions to:

calculate a clearing time for each sampling region, the calculation being based on the monitoring information received;

calculate an average clearing time, the calculation being based on the clearing times of the sampling regions; and determine, for each sampling region and for the subsequent polishing cycle, whether the clearing time calculated for the sampling region needs to be increased or reduced to improve the uniformity of the clearing profile of the first polishing process, the determining being based on a ratio of the average clearing time and the clearing time for the sampling region.

7. The product of claim 1, wherein the multiple regions of the substrate include annular regions, wherein monitoring include sampling by a system that has two or more sampling regions, each sampling region corresponding to a different annular region of the substrate, and wherein a second polishing process is performed before the first polishing process during the current and the subsequent polishing cycles, the product comprising instructions to:

calculate a clearing time for each sampling region, the calculation being based on the monitoring information received;

calculate an average clearing time, the calculation being based on the clearing times of the sampling regions; and calculate, for each sampling region and the subsequent polishing cycle, a target post-polish thickness for the second polishing process, the calculating being based on a ratio of the average clearing tine and the clearing time for the sampling region.

8. The product of claim 1, further comprising instructions to:

receive traces from one of an optical material removal monitor, an eddy current material removal monitor, and both the optical and eddy current material removal monitors.

9. The product of claim 1, further comprising instructions to:

adjust the clearing times of the first polishing process, the adjustment being based on the feedback information.

* * * * *